June 8, 1937.   L. G. COPEMAN   2,082,791
PROTECTIVE COATING AND PROCESS OF APPLYING AND REMOVING Filed Nov. 4, 1935

INVENTOR.
Lloyd G. Copeman
BY Barnes, Kisselle, Laughlin & Raisch
ATTORNEYS

Patented June 8, 1937

2,082,791

UNITED STATES PATENT OFFICE 2,082,791

PROTECTIVE COATING AND PROCESS OF APPLYING AND REMOVING

Lloyd G. Copeman, Flint, Mich.

Application November 4, 1935, Serial No. 48,125

5 Claims. (Cl. 280—152)

This invention relates to protective coatings and process of applying and removing, and has to do particularly with temporary coatings adapted to be applied to articles or surfaces to protect the same during their manipulation or making up into finished goods.

The idea of applying a temporary, readily peelable coating such as latex to articles is disclosed in my copending applications, Serial Nos. 593,279 and 597,013. Such temporary latex coatings were improved by the use of a backing material with a thin layer of plastically applied latex or similar aqueous dispersion of rubber, said backing material bonding eo the latex when set up to form a tough protective coating and to make such protective coating easily removable in large sheets.

The subject matter of the present invention, has to do with the application of temporary protective coatings, such as an aqueous dispersion of rubber, backed by paper or similar backing material, to automobile fenders and similar preassembled articles, said fenders and similar articles being permanently assembled to the automobile body, with the result that the exposed part of the temporary coating may be stripped off when desired, and the other part of the temporary coating remain permanently fixed between the fender and the body to thereby form an anti-squeak.

The portion of the temporary coating contacting with the surface or surfaces to be protected, may be applied directly to the surfaces and then backed with paper or a liquid absorbent dry aggregate or the backing may be applied to the aqueous dispersion of rubber while still plastic, and the same applied to the surfaces to be protected. A portion of this coating is applied to the automobile fender or other part of the body, or similar assembled structure, and is designed to remain as a permanent part of the assembled structure. Other features of the invention embody the steps of applying the solution of plastic material and the aggregate simultaneously, or independently, depending upon the desired degree of removability of the finished coating. Other features embody the manner of mixing the coating material, the steps and manner of application, and the particular manner in which different articles are coated.

The present invention may be best understood by describing its embodiment in connection with such an article as an automobile. In carrying out the process, I preferably use what is commonly known as latex but it will be understood that I may use aqueous dispersions of rubber in general whether natural or artificial, or any other coating substance applied in a fluid state and preferably held in solution by a solvent. Substantially any of the well-known types of latex may be used and such different types of latex may be used either in their original state or concentrated or diluted as desired.

Figure 1:
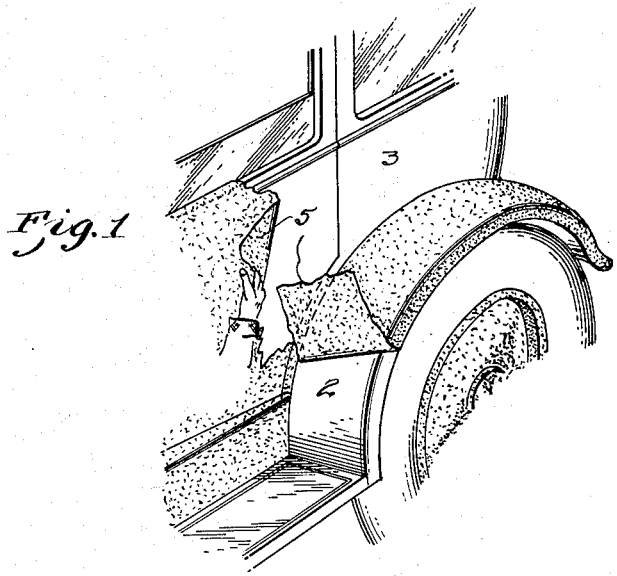
Fig. 1 illustrates a portion of an automobile body, the fender being attached thereto, and the steps of removing the exposed portions of the temporary protective coating.
Figure 2:
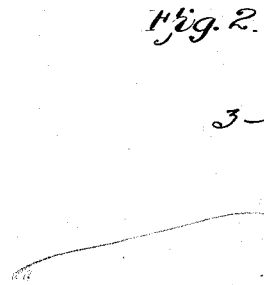
Figs. 2 and 3 illustrate the assembly of two separately coated articles in accordance with the present process wherein a portion of the coating is a temporary one and is removable, as shown as Figure 3, and the remainder of the coating permanently positioned between the two articles.
Figure 3:
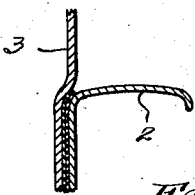

A thin, weather-protecting film of an aqueous dispersion of rubber may be applied to the automobile but such thin film would be rather difficult to remove as there would not be enough body or strength in the latex or other aqueous dispersion of rubber to peel off in large sheets. Therefore, instead of stopping with one relatively thin layer of latex, I may build up this layer of preferably four or five thicknesses so as to provide material protection against bumps and scratches. This heavier body of rubber may then, whenever desired, be removed by tearing or stripping the same off from the finished surface in relatively large sheets as shown in Figure 1.

It will be seen that with this process, individual parts may be coated and temporarily protected prior to assembly and in the case of fenders and similar articles, such as shown at 2, the rubber coated fender may be assembled to a body 3, coated with a temporary protective coating as at 4. After assembly, all the temporary protective coatings may be stripped from the assembled parts except that clamped between the fender and the body. The result is ample protection during shipment and easy removability of the coating, and also elimination of the ordinary non-squeak weld as used between fender and body. Headlights, radiators and other similar articles may be completely coated and then assembled while coated, which will make for much faster assembly because the workman will not have to be so careful in protecting the parts from scratches.

Where the latex is to be backed after it is applied to the fender, the latex may be sprayed or applied to the surface of the fender and the strips of paper then placed over the latex. This will require but one coating of latex and when the paper is applied to the latex the latex will adhere to the surface of the paper and also fill up the small interstices so that when the paper is torn away, the bond between the latex and the paper is much stronger than between the latex and whatever surface it might be applied to. If desired, the latex may be first applied to one side of the paper, that is, by dipping or by spraying, and the latex coated paper then applied to the coating of the fender or other article. As before, the latex will become an inherent part of the paper, filling the pores thereof and while normally adhering to the surface of the fender may be easily stripped therefrom particularly because of the backing of the paper. In Figure 1 I have illustrated the manner of peeling off the temporary protective coating in the form of an aqueous dispersion of rubber and a backing as at 5.

The present invention, in the main, embodies the application of what might be considered two different types of coatings, both of which are adapted to be applied and built up in a minimum amount of time, but one of which is adapted to be a temporary coating in that it is intended to be peeled off whenever desired, and the other of which is more or less permanent.

The first type of coating is particularly adapted to be applied to factory finished surfaces, that is, to automobiles, furniture, refrigerator boxes, and the like. The coating materials used may vary considerably, but in most cases I preferably use a coating material which is held in solution by a solvent or any other suitable carrying agent. This solution may be any of the various lacquers or aqueous dispersions of rubber, such as latex and, as will be later pointed out, such rubber dispersions may be so loaded with a filler as to be very plastic and just barely pour.

The aqueous dispersion of rubber or other coating agent may, of course, have various concentrations and may be combined with cheaper fillers such as clay. For instance, a mixture of latex and two hundred mesh clay will make a very desirable coating which is so thick that it will hardly pour but which may be easily sprayed upon the article to be coated. Regardless of the kind of coating material used, and whether temporary or permanent, I accelerate the setting up action and completion of the finished coating by adding a dry secondary coating material either with the coating material or on top of the layer or layers of coating material. This dry material may be paper, or wood flour, ground rubber, plaster of Paris, cotton dust, cereal flours of various kinds, etc.

I have found that if a filler such as clay is added to the aqueous dispersion of rubber or other coating material it is comparatively difficult to peel the coating from the surface, but that if a backing material of wood flour, paper or similar dry aggregate or coating material is added to the surface of the coating while still wet, the resulting coating may be easily peeled off in large strips. In other words, regardless of the particular type or kind of initial coating material used, the adding of the backing material helps materially in the setting up of the coating, in adding sufficient body to make the coating easily stripped off in large sheets, and in building up a protective coating of sufficient resilience and body which is materially cheaper than the same thickness of coating built up from successive layers of the base coating material. The wood flour, paper, ground rubber or other backing material, is less expensive than the original coating material and the use of such backing material presents a much superior coating to that built up from the successive layers of latex or the like.

Figure 4:
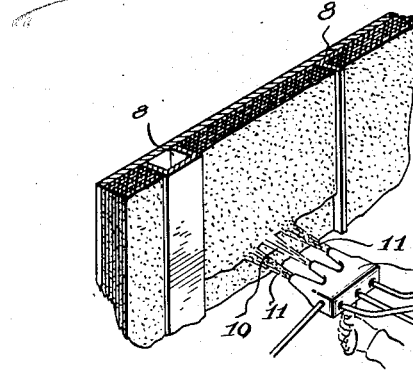
Fig. 4 is a modification wherein the dry aggregate and the liquid or plastic solution is applied at the same time and from the same gun.

In Fig. 4 I have illustrated the application of my process in the building up of an insulating and sound deadening coating to the interior of an automobile body. In this case, the spaces between the pillars 8 are filled up to the desired point and in accomplishing this I may use a combined gun as shown at 9 which will spray the main coating material as at 10 and the dry aggregate as at 11 at the same time. In the majority of cases, when the basic coat of material such as latex is sprayed simultaneously with the dry aggregate, such as wood flour, the adhesion to the surface coated is much greater and generally this is the preferred form in building up a permanent coating for insulation or sound deadening purposes. It will be understood that successive layers of basic coating material and dry aggregate may be used for building up this permanent coating and will remain permanently in position unless subjected to rather severe strains. Such a coating may be easily peeled once started, but in filling up between the pillars as in Fig. 4, such coating made of successive layers of a basic material, such as latex and an aggregate such as wood flour, will stand up permanently. Another way of building up this insulating coating is to mix the latex itself with a filler such as clay.

What I claim is:

1. The process of protecting the body and fenders of an automobile, individually and from each other, which comprises applying a solution containing a coating substance and a solvent to the body and fenders prior to assembly, forming a homogeneous coating over at least a portion of each article by the evaporation of said solvent, assembling the fenders to the body whereby a portion of the homogeneous coating is confined between each fender and the body, a portion of the said homogeneous coating on the fenders being of sufficient thickness to permit it to be readily stripped from the exposed portions of the fenders, and a portion of said coating being permanently confined between the fender and the body to act as anti-squeak.

2. The process of protecting the body and fenders of an automobile, individually and from each other, which comprises applying a solution containing an elastic coating substance and a solvent to the body and fenders prior to assembly, forming a homogeneous coating over at least a portion of each article by the evaporation of said solvent, assembling the fenders to the body whereby a portion of the homogeneous coating is confined between each fender and the body, a portion of the said homogeneous coating on the fenders being of sufficient thickness to permit it to be readily stripped from the exposed portions of the fenders, and a portion of said coating being permanently confined between the fender and the body to act as anti-squeak.

3. The process of protecting a plurality of articles individually and from each other, which comprises applying a solution containing a coating substance and a solvent to the individual articles, forming a homogeneous coating over at least a portion of each article by the evaporation of said solvent, assembling said articles whereby a portion of the homogeneous coating on one article is confined between said article and an adjacent article, a portion of said homogeneous coating being of sufficient thickness to permit it to be readily stripped from the article or articles, and a portion of said coating being permanently confined between said assembled articles.

4. The process of protecting a plurality of articles individually and from each other, which comprises applying a solution containing an elastic coating substance and a solvent to the individual articles, forming a homogeneous coating over at least a portion of each article by the evaporation of said solvent, assembling said articles whereby a portion of the homogeneous coating on one article is confined between said article and an adjacent article, a portion of said homogeneous coating being of sufficient thickness to permit it to be readily stripped from the article or articles, and a portion of said coating being permanently confined between said assembled articles.

5. The process of temporarily protecting the surfaces of parts going into the fabrication and manufacture of a complete article, which comprises applying temporary coating substances including an aqueous dispersion of rubber and a coating of liquid absorbent, relatively inert cheap building up material to surfaces of respective articles, depositing the rubber from said aqueous dispersion, said building up material being bonded to the rubber coating during the setting up step to form a flexible coating, assembling the surface protected parts into a complete article and then removing at least a portion of said protective coating to uncover exposed surfaces of the complete article, a portion of the protective coating being permanently retained by the assembled parts.

LLOYD G. COPEMAN.